(12) United States Patent
Landry et al.

(10) Patent No.: US 11,513,782 B1
(45) Date of Patent: Nov. 29, 2022

(54) UNRESTRICTED TO RESTRICTED COMPUTING FRAMEWORK

(71) Applicant: Amazon Technologies, Inc., Seattle, WA (US)

(72) Inventors: Brian Landry, San Diego, CA (US); Arun Nagaraja Donti, Herndon, VA (US); Christopher Coulson Milbert, Purcellville, VA (US); Cullen Timothy Frye, Arlington, VA (US); Philip Joseph Nolan, McLean, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/358,409

(22) Filed: Jun. 25, 2021

(51) Int. Cl.
*G06F 9/44* (2018.01)
*G06F 9/455* (2018.01)
*G06F 9/445* (2018.01)
*G06F 8/60* (2018.01)
*G06F 21/56* (2013.01)

(52) U.S. Cl.
CPC .............. *G06F 8/60* (2013.01); *G06F 21/562* (2013.01); *G06F 2221/033* (2013.01)

(58) Field of Classification Search
CPC ..... G06F 8/60; G06F 21/562; G06F 2221/033
See application file for complete search history.

(56) References Cited

U.S. PATENT DOCUMENTS 10,826,991 B2 * 11/2020 Tan .................. H04N 9/8042

OTHER PUBLICATIONS

Ogwara et al., MOBDroid: An Intelligent Malware Detection System for Improved Data Security in Mobile Cloud Computing Environments, 6 pages (Year: 2020).*

\* cited by examiner

*Primary Examiner* — Thuy Dao
(74) *Attorney, Agent, or Firm* — BakerHostetler

(57) ABSTRACT

A multi-stage computing framework may allow development, in an unrestricted computing region, of one or more computing resources that are transferred to, and deployed in, a restricted computing region. The computing framework may include a development module and a transfer module. The development module may allow development of the computing resources in the unrestricted computing region, for example including stages such as a resource creation, linting, scanning, validation, packaging and requesting of the transfer. The transfer module may allow management of the transfer of the computing resources from the unrestricted computing region to the restricted computing region, for example including stages such as control, transfer request queueing, performance of the transfer, transfer notification and transfer visualization.

20 Claims, 9 Drawing Sheets

---

610 Receive, in an unrestricted computing region, one or more computing resources (e.g., received from a customer-provided repository and optional build process or received from a storage location)

↓

612 Scan, in the unrestricted computing region, the one or more computing resources for computing viruses

↓

614 Package, in the unrestricted computing region, the one or more computing resources for transfer to a restricted computing region, wherein the packaging comprises at least one of generating a manifest file for the one or more computing resources or removing file types of the one or more computing resources that are unsupported by a region transfer tool

↓

616 Provide, to a transfer module, a request for transfer of the one or more computing resources (e.g., including related information such as storage location, payload key, manifest key, designated notification recipient)

UNRESTRICTED TO RESTRICTED COMPUTING FRAMEWORK

BACKGROUND

Computing regions are separate collections of computing units (e.g., data centers, servers, virtual machines, etc.) that are provided by a computing services provider (e.g., a cloud and/or web services provider) and that may be located in corresponding geographic areas. Restricted computing regions are computing regions that are designated to host sensitive data and that have restrictions that are designed to allow secure hosting of the sensitive data, such as restrictions over the users, services, packages, tools and/or other entities that are permitted to operate within the region. An unrestricted computing region is a region that is not specifically designated for handling sensitive data and that does not require the corresponding sensitive data-based restrictions of a restricted computing region. It is not, however, required that an unrestricted region must have zero restrictions. One example of a restricted computing region is a classified computing region, which is a restricted computing region that is designated and designed to host classified data, such as classified government-related data. An unclassified computing region is an unrestricted region and is not designated and not designed to host classified data. In restricted computing regions, approved software packages, managed services, and tools enabling development are often scarce. This may force some customers to build, secure, maintain, scale, and operate packages, services and tools of their own. This is disadvantageous, such as because development teams want to focus their finite development capacity on developing applications—and not on configuring and maintaining the tools that enable that development.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
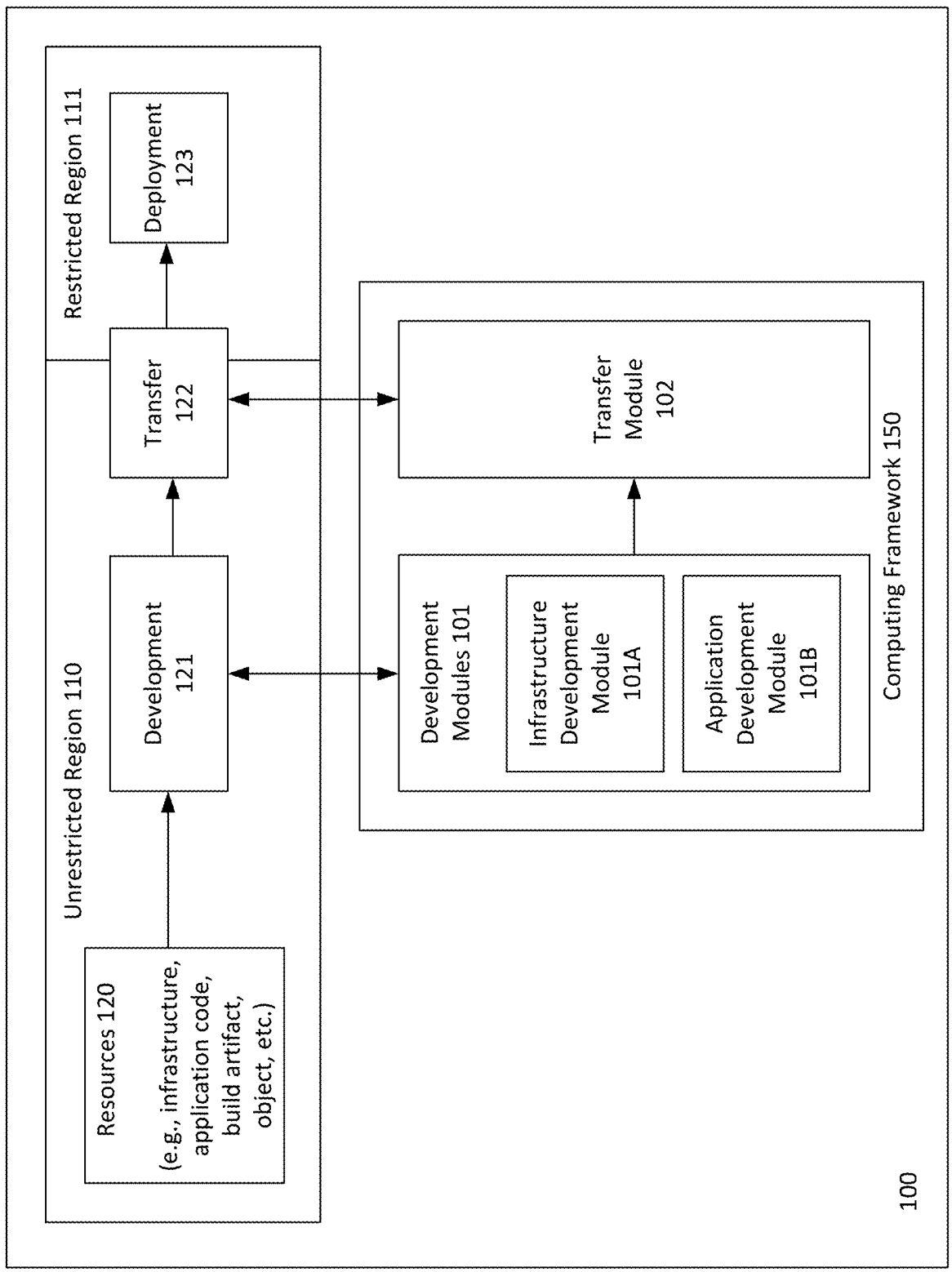
FIG. 1 is a diagram illustrating an example unrestricted to restricted computing development and transfer system that may be used in accordance with the present disclosure.

Techniques for implementing an unrestricted to restricted computing framework are described herein. The unrestricted to restricted computing framework (also referred to hereinafter as the computing framework) enables development in unrestricted regions and deployment in restricted regions, such as using a flexible, secure, automated and scalable process. In one example, a restricted region may be a classified region, and an unrestricted region may be an unclassified region. Thus, any, or all, of the references herein to a restricted region should be considered to optionally apply to a classified region, while any, or all, of the references herein to an unrestricted region should be considered to optionally apply to an unclassified region. The computing framework may provide a multi-stage approach, with stages to scan, package, and transfer objects, application code, build artifacts and/or infrastructure. Additional stages may be offered to lint application code, perform static code analysis, and validate infrastructure deployment subject to customer-defined roles, such as to promote standard, consistent, and quality build artifacts. Integrating unrestricted region testing into the computing framework allows developers to fail faster (in the unrestricted region) without the wasted time and expense of waiting to fail until transfer to the restricted region. The computing framework may enable customers to push frequent, iterative commits of their objects, application code, and build artifacts to their restricted environment. The computing framework may reduce drag moving applications to the restricted region, reduce the feedback cycle, reduce cost, increase traceability, increase accuracy, and increase repeatability. While some other approaches may employ emulators to attempt to emulate a restricted region environment, emulators may not be entirely desirable, such as because emulators cannot exactly duplicate a true restricted region environment and because there may be time delays until changes to a high side environment are reflected in an emulated environment. Greater emphasis on unrestricted region development also decreases ramp-up time, as it does not require developers to have clearances, sensitive compartmented information facility (SCIF) access, or restricted region accounts.

The versatile and selectable multi-stage approach of the computing framework allows a customer to select to include (or not include) one or more stages of the computing framework in a given invocation of the computing framework based on the capabilities that the customer wants. For example, if a customer wants to use the customer's own region transfer tool, the computing framework can scan and package the payload, but not transfer the payload, thereby allowing the customer to transfer the payload to the restricted region using the customer's own selected region transfer tool. Within the stages, a customer may also select to include (or not include) one or more features of the computing framework. For example, if the computing framework offers a particular managed source control service repository, but the customer would prefer to use a different managed source control service, the computing framework may accommodate this user preference and allow use of the customer's preferred managed source control service. A computing framework, as that term is used herein, refers to a pre-defined set of computing operations (e.g., stages) and computing components (e.g., modules) for performing one or more computing tasks (e.g., resource development and transfer to a restricted region), wherein one or more of the stages and/or components may be selectively included or excluded from a given invocation of the computing framework to meet given constraints of the invocation.

The computing framework may include both a development module and a transfer module. The development module may allow development of a computing resource in an unrestricted region, while a transfer module may allow transfer of the computing resource from the unrestricted region to the restricted region. In some examples, the computing framework may provide two types of development modules, which may include an infrastructure development module and an application development module. In some examples, the infrastructure development module may be employed for developing, in an unrestricted region, computing infrastructure for deployment in a restricted region. By contrast, in some examples, the application development module may be employed for developing, in an unrestricted region, an application for deployment onto existing computing infrastructure in a restricted region. For example, the application development module may often be used by developers that wish to prepare source code, a build artifact and/or an object for transfer to a restricted region. By contrast, the infrastructure development module may often be used by developers that desire a more extensive cloud environment, such as to include automated deployment with infrastructure as code. In some examples, the application development module may be a more light-weight module, while the infrastructure development module may provide a more curated approach. For example, in some cases, the infrastructure development module may include additional stages and features that may not be provided by the application development module. As a specific example, the infrastructure development module may include linting and validation stages that may not be provided by the application development module. As another example, in some cases, the infrastructure development model may provide a pre-configured source control repository, while the application development module may instead include customer-configured repositories provided by customers.

The transfer module is a module that may optionally be employed for scenarios in which customers want an automated process to manage transfer of resources from the unrestricted region to the restricted region. Customers may alternatively opt not to use the transfer module and may instead manually manage their own transfer processes, such as using their own selected region transfer tools. As described in detail below, in addition to merely transferring resources, the transfer module may perform additional stages/operations, such as a control stage for enforcement of queue policies for queueing of transfer requests, a queueing stage in which transfer requests are queued, a transfer stage in which resources are actually transferred to the restricted region, a notification stage in which notifications regarding a status of a transfer may be sent to recipients indicated by a development module, and a visualization stage in which a customer's transfers and their corresponding statuses may be viewed in a dashboard.

FIG. 1 is a diagram illustrating an example of an unrestricted to restricted computing development and transfer system 100 that may be used in accordance with the present disclosure. As shown in FIG. 1, one or more resources 120 may be developed in an unrestricted region 110 and transferred to a restricted region 111 using computing framework 150. The unrestricted region 110 and the restricted region 111 are computing regions provided by a computing services provider (e.g., a cloud and/or web services provider). In one example, the restricted region 111 is a classified region, and the unrestricted region 110 is an unclassified region. Thus, any, or all, of the references herein to restricted region 111 should be considered to optionally apply to a classified region, while any, or all, of the references herein to unrestricted region 110 should be considered to optionally apply to an unclassified region. The resources 120 may include, for example, computing infrastructure, application code, build artifacts, and/or one or more computing objects. The term computing infrastructure, as used herein, refers to resources that support execution of an application or other resources. The term build artifact, as used herein, refers to files or other resources produced by a build. As shown, the computing framework 150 includes development modules 101 and transfer module 102. The development modules 101 include infrastructure development module 101A and application development module 101B. As described above, in some examples, for a given invocation of the computing framework 150, a user (e.g., customer) may select to use either infrastructure development module 101A or application development module 101B, for example based on the types of resources 120 that are being developed and transferred to the restricted region 111. As shown in FIG. 1, the development modules 101 may allow development 121 of resources 120 in the unrestricted region 110, such as for eventual deployment 123 of the resources 120 in the restricted region 111. As also shown in FIG. 1, the transfer module 102 may manage transfer 122 (and associated operations) of the resources 120 from the unrestricted region 110 to the restricted region 111. Some examples of stages and features of the development modules 101 and the transfer module 102 are described in detail below with reference to FIGS. 2-4.

Figure 2:
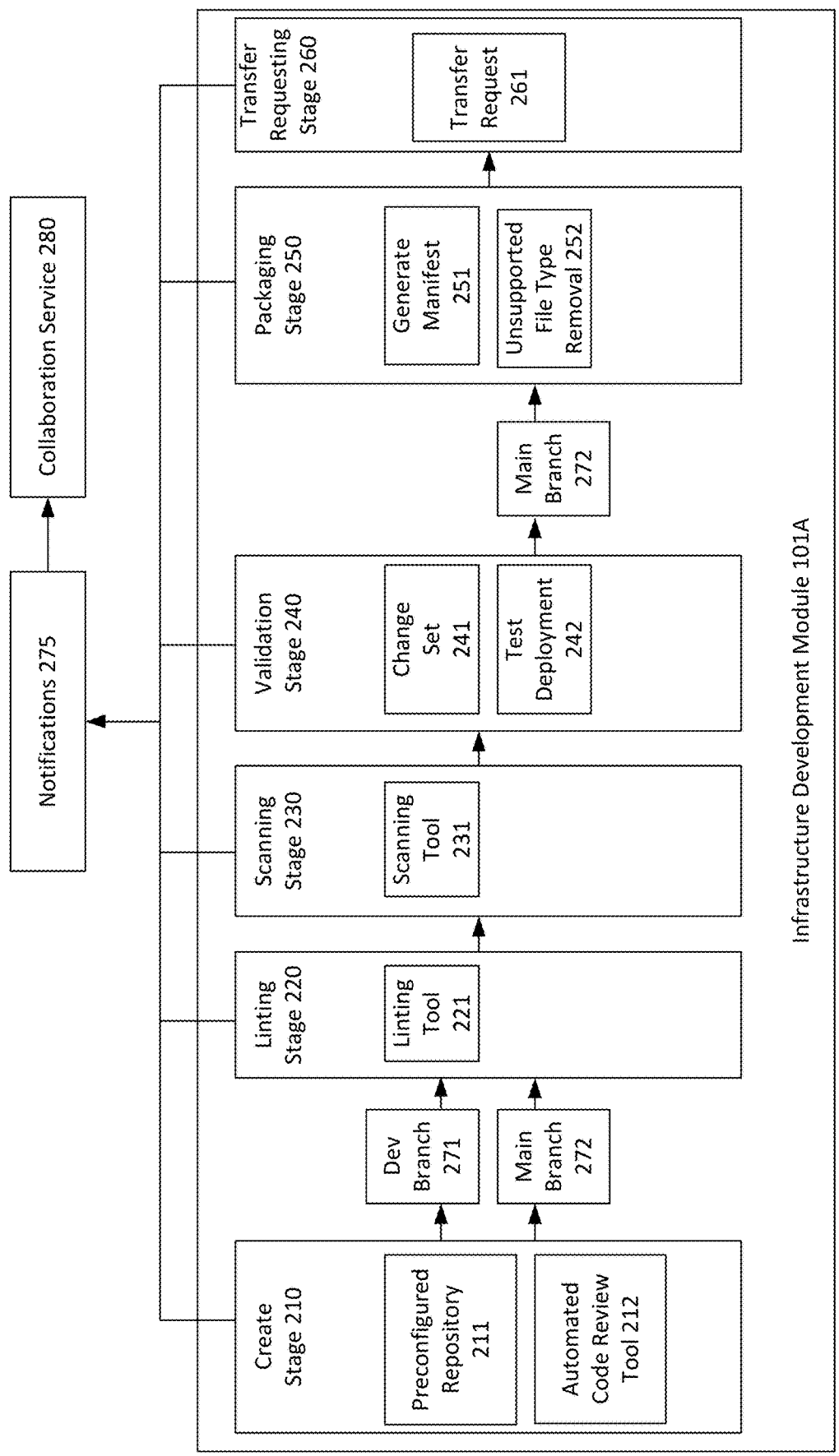
FIG. 2 is a diagram illustrating an example infrastructure development module that may be used in accordance with the present disclosure.

Referring now to FIG. 2, some example stages and features of infrastructure development module 101A will now be described in detail. As described above, in some examples, the infrastructure development module 101A may be employed for developing computing infrastructure for deployment in restricted region 111. For example, the infrastructure development module 101A may often be used by developers that desire a more extensive cloud environment and a more curated approach (as compared to application development module 101B), such as to include automated deployment with infrastructure as code. As shown, the infrastructure development module 101A may include a create stage 210, in which resources 120 may be created in, and received from, a preconfigured repository 211 of a managed source control service. The preconfigured repository 211 may be configured by a service that provides the computing framework 150. The preconfigured repository 211 may be designed to help developers continuously create code, templates, documentation, and deliverables with little friction. The preconfigured repository 211 may include easily removable examples and documentation, such as default code for executing in a customer environment and best practices associated with use of various services. In some examples, the infrastructure development module 101A may provide code review tool 212, which may be an automated (e.g., machine learning-based) tool for use in reviewing and debugging code that may be in the preconfigured repository 211.

The preconfigured repository 211 may include a development (dev) branch 271 and a main branch 272. As software is developed, not every commit is likely to be worthy of the time and effort to individually transfer to the restricted region 111. Thus, the dev branch 271 may be used to develop resources until those resources reach a desired level of maturity (e.g., pass a certain level of testing). Once changes have reached the desired level of maturity, the changes may be merged from the dev branch 271 to the main branch 272 and packaged and transferred to the restricted region 111. In some examples, the computing framework 150 may employ a managed continuous delivery service to assist in creating the dev branch 271 and the main branch 272.

The infrastructure development module 101A may also include a linting stage 220 (for both the dev branch 271 and the main branch 272), in which resources 120 may be linted using linting tool 221, which may be an automated tool for resource linting. The term linting, as used herein, refers to a static code or other static analysis, such as to determine programming errors, bugs, etc. For example, the linting stage 220 may include reviewing templates and ensuring that security-related best practices are observed. In some examples, the computing framework 150 may trigger a serverless computing function to employ the linting tool 221. The use of a serverless computing function may reduce customer costs and improve efficiency, such as by not requiring a reserved computing capacity for performance of the linting stage 220 (and for other scenarios described herein in which a serverless computing function may be used). In some examples, the computing framework 150 may create a storage location (e.g., bucket) to which custom linting rules can be added. The infrastructure development module 101A may also include a scanning stage 230 (for both the dev branch 271 and the main branch 272), in which resources 120 may be scanned for computing viruses using scanning tool 231, which may be an automated tool for resource scanning. In some examples, the infrastructure development module 101A may trigger a project of a managed build service to manage the scanning stage 230. In some examples, definitions for scanning tool 231 may be updated with each invocation of the computing framework 150.

The infrastructure development module 101A may also include a validation stage 240 (for both the dev branch 271 and the main branch 272), in which the computing framework 150 may determine, for example based on templates or other information from the preconfigured repository 211, a change set 241 (or other changes) associated with the infrastructure or other resources 120 being developed. The computing framework 150 may then attempt a test deployment 242 of the change set 241 (or other changes), for testing purposes, in the unrestricted region 110. If the changes are deployed successfully in the unrestricted region 110, then this may be an indication that the changes are likely to deploy successfully in the restricted region 111. By contrast, if the changes are not deployed successfully in the unrestricted region 110, then this may be an indication that the changes are unlikely to deploy successfully in the restricted region 111. In some examples, the test deployment 242 in the unrestricted region 110 may be subject to customer-specific constraints, such as identity management permissions associated with the customer. For example, if a customer's identity management permissions require that a given role must create a key, while another role must create a database table, then these constraints may be enforced during the test deployment in the unrestricted region 110. This may help the customer to determine potential permissions-related problems prior to deployment in the restricted region 111. In some examples, if an architecture requires virtual private clouds, then virtual private clouds that mimic the customer's environment may optionally be deployed.

The infrastructure development module 101A may also include a packaging stage 250 (for main branch 272), in which resources 120 may be packaged for transfer to restricted region 111. For example, on successful builds of the main branch 272, one or more files of the main branch 272 (and optionally the corresponding build artifacts) may be placed in a storage location (e.g., bucket) for testing and delivery. Specifically, in some examples, a region transfer tool, which may be used to transfer resources to restricted region 111, may provide two types of transfers, which are file transfers and software artifact transfers. Additionally, in some examples, the region transfer tool may support file transfers only for certain file types. File types that are supported by the region transfer tool that is being used are referred to hereinafter as supported file types. By contrast, file types that are not supported by the region transfer tool that is being used are referred to hereinafter as unsupported file types. In some examples, the packaging stage 250 may include unsupported file type removal 251. During unsupported file type removal 251, unsupported file types may be identified and removed from the resources 120 that are being transferred to the restricted region 111. Furthermore, in some examples, for software artifact transfers, the region transfer tool may require a manifest file to be generated for the resources 120 that are being transferred to the restricted region 111. In some examples, the packaging stage 250 may additionally or alternatively include manifest generation 252, in which the manifest file may be generated. In some examples, a manifest file may sometimes be generated even if not explicitly required by a region transfer tool that is being used to perform the resource transfer to the restricted region 111. Upon performance of unsupported file type removal 251 and/or manifest generation 252, the resulting payload may be uploaded to a data storage service. The data may be protected at rest using customer-managed keys in a key management service. It is noted that data that is in transit at one or more stages of the computing framework 150 may optionally be protected using secure sockets layer (SSL)/transport layer security (TLS) calls to a software development kit (SDK), such as provided by a cloud/hosting service.

As shown in FIG. 2, notifications 275 may be generated by the infrastructure development module 101A. The notifications 275 may correspond to any, or all, of create stage 210, tinting stage 220, scanning stage 230, validation stage 240, packaging stage 250 and/or transfer requesting stage 260 (referred to collectively hereinafter as stages 220-260). For example, in some cases, one or more of notifications 275 may provide an indication of an initiation and/or a successful completion of any one or more of stages 220-260. Additionally, in some examples, one or more of notifications 275 may indicate a problem and/or error associated with any one or more of stages 220-260. As a specific example, in some cases, if any infected files are found during scanning stage 230, the computing framework 150 may abort the build process and provide an indication of the results via one or one or more of notifications 275. In some examples, the notifications 275 may be provided to one or more designated recipients. In some examples, a designated recipient may itself include a group of recipients. In one specific example, a designated recipient may be a topic of a notification service, such as may be identified using a resource name.

In some examples, developers that are working on the development 121 of resources 120 may collaborate with one another using a collaboration service 280. Additionally, in some examples, the collaboration service 280 may be subscribed to receive notifications 275. This may allow the developers to be quickly and consistently informed of updates to the status of the development 121 and transfer 122 of resources 120. In one specific example, a systems manager service parameter may be provided with a webhook associated with one or more features (e.g., a chat room) of the collaboration service 280, and a serverless computing function that writes to that webhook may be subscribed to a designated recipient (e.g., a topic of a notification service) of notifications 275. In some examples, an identification of the webhook may be stored in a parameter store and may be encrypted with a service-managed key.

As also shown in FIG. 2, the infrastructure development module 101A may further include a transfer requesting stage 260 (for main branch 272), in which a transfer request 261 may be sent to transfer module 102. In some examples, the transfer request 261 may be sent by a serverless computing function. In addition to, or as part of, the transfer request 261, the infrastructure development module 101A may provide related information to the transfer module 102, such as an indication of a storage location (e.g., bucket) at which the payload for transfer is stored, a payload key, a manifest key, and an indication of a designated recipient that is to receive notifications about the transfer request 261, which may be the same designated recipient (e.g., a topic of a notification service) that may receive notifications 275 from infrastructure development module 101A.

Figure 3:
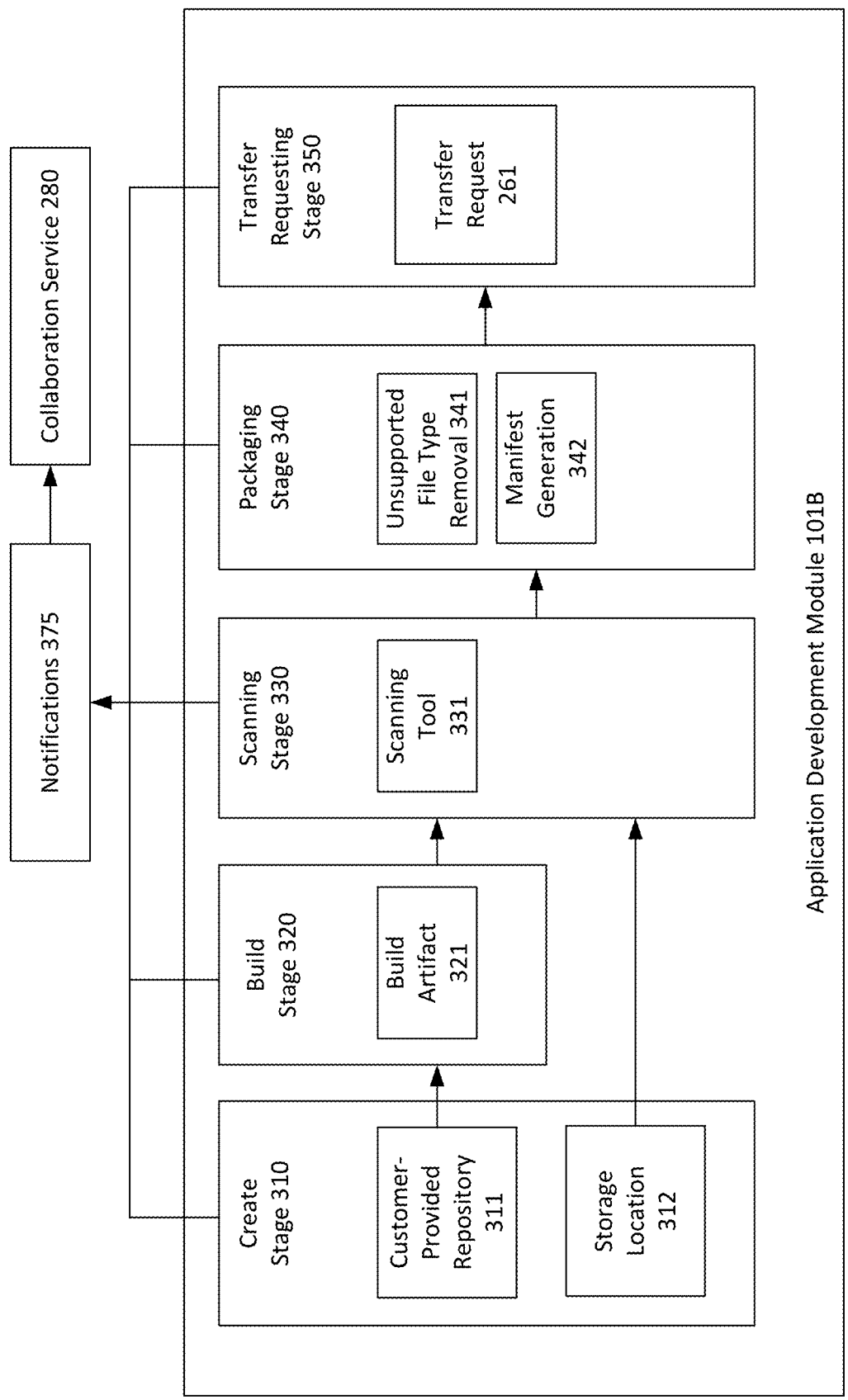
FIG. 3 is a diagram illustrating an example application development module that may be used in accordance with the present disclosure.

Referring now to FIG. 3, some example stages and features of application development module 101B will now be described in detail. As described above, in some examples, the application development module 101B may be employed for developing an application for deployment onto existing computing infrastructure in a restricted region 111. For example, the application development module 101B may often be used by developers that wish to prepare source code, a build artifact and/or an object for transfer to a restricted region 111. In some examples, the application development module 101B may be a more light-weight module and may offer a less curated approach than the infrastructure development module 101A. As shown in FIG. 3, the application development module 101B may include a create stage 310. In some examples, the input sources for the create stage 310 may include a customer-provided repository 311 and a storage location 312. In some examples, the customer-provided repository 311 may be employed for scenarios in which developers are building from source code, while the storage location 312 may be used in scenarios in which an object is being transferred to restricted region 111. The customer-provided repository 311 may be a managed source control service repository that is provided and configured by a customer of the computing framework 150. By contrast, the storage location 312 may be a selected location in which objects or other resources 120 may be stored for transfer without the use of a managed source control service repository.

For scenarios in which customer-provided repository 311 is used as an input source, the application development module 101B may include a build stage 320, in which a project of a managed build service may be triggered to produce a build artifact 321. The code or other resources from the customer-provided repository 311 and/or the build artifact 321 may then be virus scanned, during scanning stage 330, by a scanning tool 331. By contrast, for scenarios in which storage location 312 is used as an input source, the build stage 320 may be omitted, as a build may be unnecessary for object transfer scenarios. In some examples, when storage location 312 is used as an input source, a serverless computing function may be triggered to invoke the scanning tool 331 to virus scan the resources 120 from the storage location 312. Scanning tool 331 may be an automated tool for resource scanning. In some examples, definitions for scanning tool 331 may be updated with each invocation of the computing framework 150.

The application development module 101B may also include a packaging stage 340, in which resources 120 may be packaged for transfer to restricted region 111. As described above, in some examples, a region transfer tool, which may be used to transfer resources to restricted region 111, may provide two types of transfers, which are file transfers and software artifact transfers. Additionally, in some examples, the region transfer tool may support file transfers only for certain file types. In some examples, the packaging stage 340 may include unsupported file type removal 341. During unsupported file type removal 341, unsupported file types may be identified and removed from the resources 120 that are being transferred to the restricted region 111. As also described above, for software artifact transfers, the region transfer tool may require a manifest file to be generated for the resources 120 that are being transferred to the restricted region 111. In some examples, the packaging stage 340 may additionally or alternatively include manifest generation 342, in which the manifest file may be generated. In some examples, a manifest file may sometimes be generated even if not explicitly required by a region transfer tool that is being used to perform the resource transfer to the restricted region 111. Upon performance of unsupported file type removal 341 and/or manifest generation 342, the resulting payload may be uploaded to a data storage service. The data may be protected at rest using customer-managed keys in a key management service.

As shown in FIG. 3, notifications 375 may be generated by the application development module 101B. The notifications 375 may correspond to any, or all, of create stage 310, build stage 320, scanning stage 330, packaging stage 340 and/or transfer requesting stage 350 (referred to collectively hereinafter as stages 310-350). For example, in some cases, one or more of notifications 375 may provide an indication of an initiation and/or a successful completion of any one or more of stages 310-350. Additionally, in some examples, one or more of notifications 375 may indicate a problem and/or error associated with any one or more of stages 310-350. As a specific example, in some cases, if any infected files are found during scanning stage 330, the computing framework 150 may abort the build process and provide an indication of the results via one or one or more of notifications 375. In some examples, the notifications 375 may be provided to one or more designated recipients. In some examples, a designated recipient may itself include a group of recipients. In one specific example, a designated recipient may be a topic of a notification service, such as may be identified using a resource name.

As described above, in some examples, developers that are working on the development 121 of resources 120 may collaborate with one another using a collaboration service 280. Additionally, in some examples, the collaboration service 280 may be subscribed to receive notifications 375. This may allow the developers to be quickly and consistently informed of updates the status of the development 121 and transfer 122 of resources 120. In one specific example, a systems manager service parameter may be provided with a webhook associated with one or more features (e.g., a chat room) of the collaboration service 280, and a serverless computing function that writes to that webhook may be subscribed to a designated recipient (e.g., a topic of a notification service) of notifications 375.

As also shown in FIG. 3, the application development module 101B may further include a transfer requesting stage 350, in which a transfer request 261 may be sent to transfer module 102. In some examples, the transfer request 261 may be sent by a serverless computing function. In addition to, or as part of, the transfer request 261, the application development module 101B may provide related information to the transfer module 102, such as an indication of a storage location (e.g., bucket) at which the payload for transfer is stored, a payload key, a manifest key, and an indication of a designated recipient that is to receive notifications about the transfer request 261, which may be the same designated recipient (e.g., a topic of a notification service) that may receive notifications 375 from application development module 101B.

Figure 4:
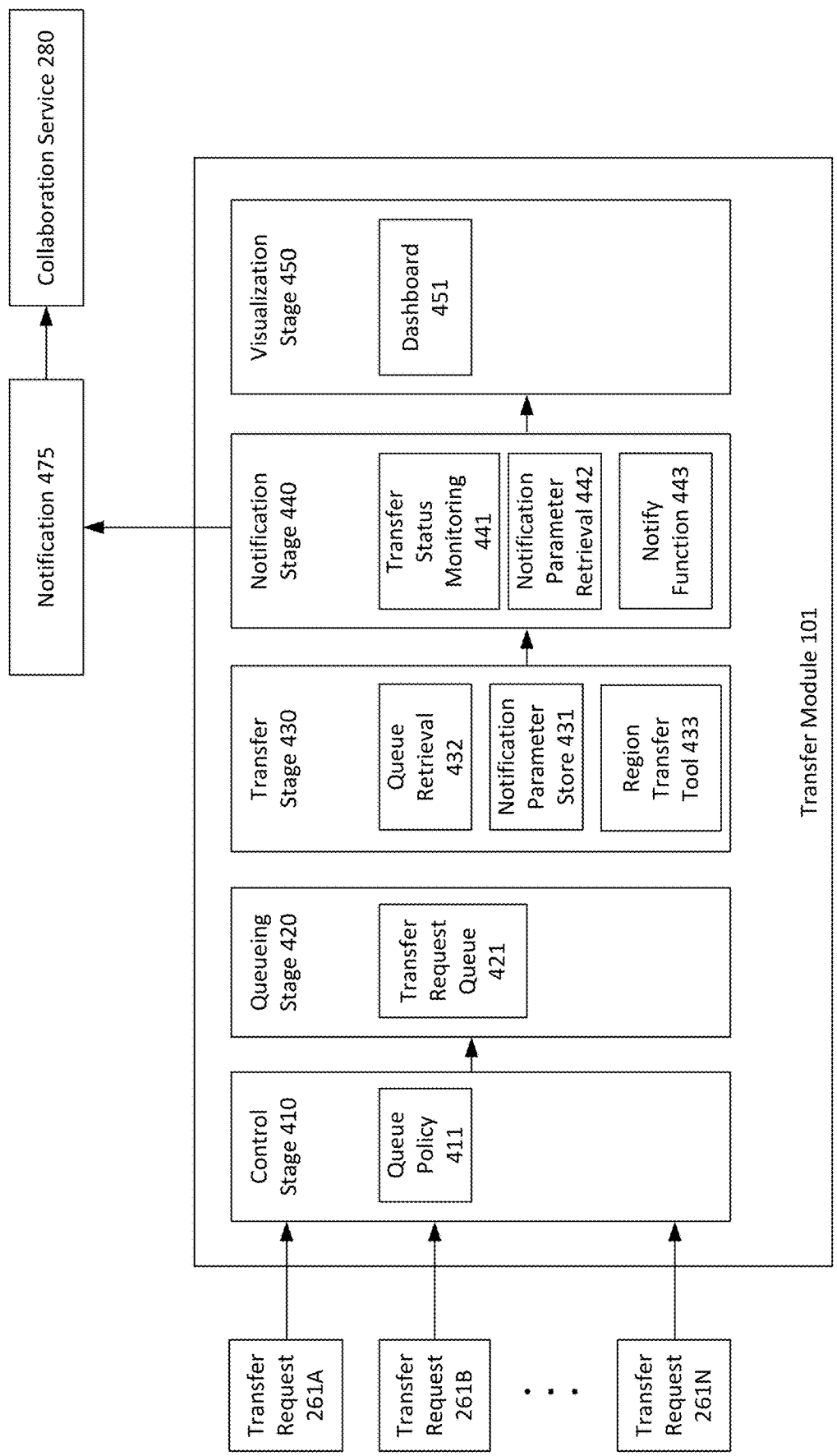
FIG. 4 is a diagram illustrating an example transfer module that may be used in accordance with the present disclosure.

Referring now to FIG. 4, some example stages and features of transfer module 102 will now be described in detail. As shown in FIG. 4, transfer requests 261A-N may be received by transfer module 102. The transfer requests 261A-N are individual instances of transfer request 261, which, as shown in FIGS. 2 and 3, may be issued by infrastructure development module 101A and/or application development module 101B. The transfer requests 261A-N may be sent to a transfer request queue 421. The transfer request queue 421 may be protected by a queue policy 411, which may allow only principals from certain designated accounts to write to the transfer request queue 421. For example, a customer may identify the accounts that the customer wishes to authorize to issue transfer requests 261A-N. These identified accounts may then be listed in queue policy 411. During control stage 410, the transfer module 102 may examine incoming transfer requests 261A-N to ensure that each of the transfer requests 261A-N is issued by one of the listed authorized accounts. If a given one of the transfer requests 261A-N is issued by one of the listed authorized accounts, then it may be added to the transfer request queue 421. By contrast, if another given one of the transfer requests 261A-N is not issued by one of the listed authorized accounts, then it may be excluded from the transfer request queue 421. In some examples, a hub and spoke model may be employed in which multiple development module accounts feed (i.e., provide transfer requests 261A-N to) a single transfer module 102 (executed in a single transfer module account). In some examples, the list of authorized accounts may be stored in a parameter store and may be encrypted with a service-managed key.

At queueing stage 420, the authorized ones of transfer requests 261A-N are written to the transfer request queue 421. As described above, each of transfer requests 261A-N may include, or may be associated with, related information, such as a payload key, a manifest key, and an indication of a designated recipient that is to receive notifications. This related information may also be stored in, or referenced by, transfer request queue 421

The transfer module 102 also includes a transfer stage 430, at which resources 120 are transferred to the restricted region 111 via a region transfer tool 433. Specifically, during queue retrieval 432 of transfer stage 430, a series of serverless computing functions may read off the transfer request queue 421. In particular, when a next one of transfer requests 261A-N is ready to be processed (e.g., when it moves to the front of the transfer request queue 421), the corresponding queue entry will be read from transfer request queue 421. This may also include reading of related information included in, or otherwise associated with, the entry, such as a payload key, a manifest key, and an indication of a designated recipient that is to receive notifications. Based on this related information, the series of serverless computing functions may copy the payload for transfer to a designated storage service location. The series of serverless computing functions may also initiate transfer of the payload via region transfer tool 433, which may then perform the transfer of the corresponding resources 120 to the restricted region 111. Data in the designated storage service location and the transfer request queue 421 may be protected at rest using customer-managed keys of a key management service. A manifest for the transfer may also be obtained based on information provided in the transfer request 261 and provided to the region transfer tool 433. In some examples, a key management service asymmetric key may be generated in a development module account and used to sign the manifest. The transfer module account may then be granted permissions to verify the signature with the key management service to ensure that the signature is valid. Other checks may be also performed, such as to confirm that the signature matches with the file.

Additionally, a transfer identifier (ID) for the transfer may be received from the region transfer tool 433. Furthermore, an identifier of a designated notification recipient (e.g., a resource name for a topic of the notification service) for the transfer may be determined based on information provided by the development module 101 in combination with the transfer request 261. The series of serverless computing functions may then store an association between the transfer ID and the designated notification recipient in a notification parameter store 431, such as may be provided by a database service. The data in the notification parameter store 431 may be protected using service-managed keys of a key management service.

The transfer module 102 also includes a notification stage 440. The notification stage 440 includes status monitoring 441, at which the region transfer tool 433 may be monitored to listen for a report of the status (e.g., success, failure or rejection) of the transfer operation. In some examples, the status monitoring 441 may be performed via an event of a monitoring service. This event may then trigger a serverless computing function with the status of the transfer operation. The report of the status may include the transfer ID for the transfer. During notification parameter retrieval 442, the transfer ID received with the status may be used to look up, in the notification parameter store 431, the corresponding designated notification recipient (e.g., a resource name for a topic of the notification service) for the transfer. A notify function 443, such as a serverless computing function, may then send a notification 475 with the transfer ID and transfer status (e.g., success, failure or rejection) to the corresponding designated notification recipient. This may optionally cause the notification 475 to be received in a collaboration service 280, which, as described above, may be subscribed, such as via a webhook, to the designated notification recipient. This may allow developers that are working on the resources 120 to be notified of the statuses of transfer of the resources 120 even when the account that issues a transfer request 261 (e.g., the development module account) is different from the account that executes the transfer module 102 (e.g., the transfer module account). The corresponding record (i.e., the association between the transfer ID and the designated notification recipient) may then be deleted from the notification parameter store 431.

The transfer module 102 also includes a visualization stage 450. As part of the visualization stage 450, statuses of transfer requests 261A-N may be displayed to users via a dashboard 451, such as may be provided by a monitoring service. In some examples, the dashboard 451 may display indications of transfers of transfer module 102 categorized into different status categories (e.g., success, failure or rejection), for example based on parameters such as count and size.

Figure 5:
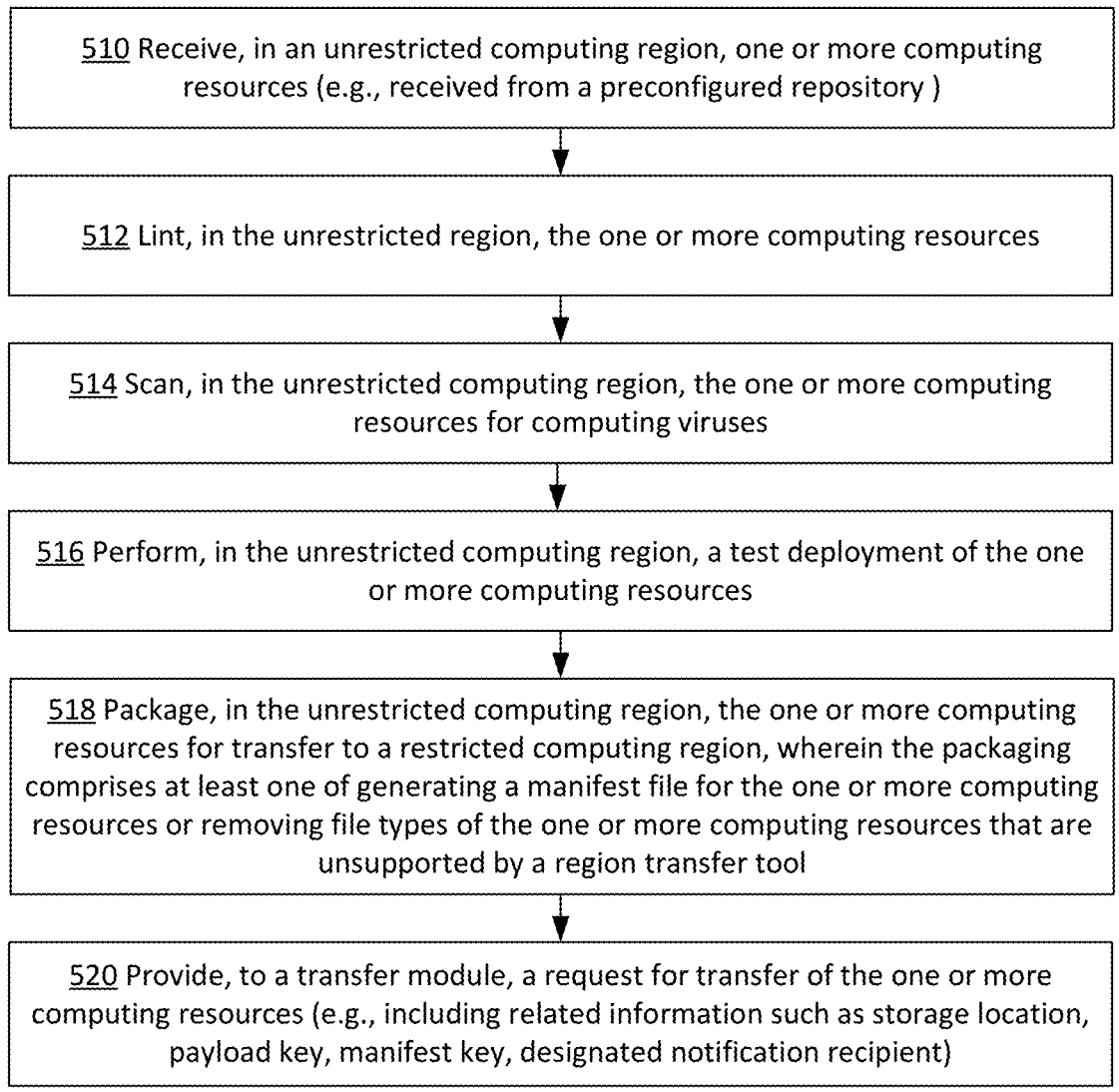
FIG. 5 is a flowchart illustrating an example resource development process employed by an infrastructure development module that may be used in accordance with the present disclosure.
Figure 6:
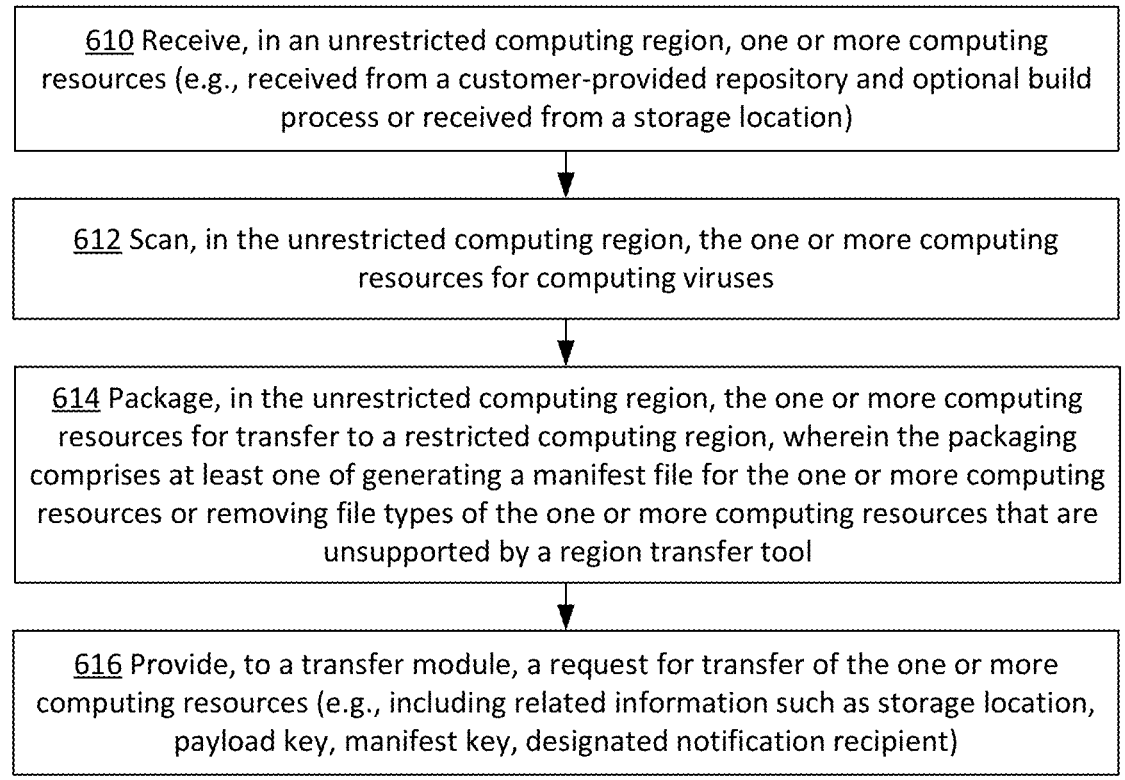
FIG. 6 is a flowchart illustrating an example resource development process employed by an application development module that may be used in accordance with the present disclosure.

FIG. 5 is a flowchart illustrating an example resource development process employed by an infrastructure development module that may be used in accordance with the present disclosure. It is noted that any, or all, of the operations in FIGS. 5-7 may be performed by a multi-stage computing framework (e.g., computing framework 150 of FIG. 1) that allows development, in an unrestricted computing region, of the one or more computing resources that are transferred to, and deployed in, a restricted computing region. As described above, one or more stages of the multi-stage computing framework may be selectable, by a user, to be included in, or excluded from, an invocation of the multi-stage computing framework. Any, or all, of the operations of FIG. 5 and/or FIG. 6 may be performed by a selected development module. FIG. 5 shows an example in which the selected development module may be an infrastructure development module. FIG. 6 shows an example in which the selected development module may be an application development module. As described above, the multi-stage computing framework may provide a plurality of development modules from which the selected development module may be selected. The plurality of development modules may comprise a first development module associated with computing infrastructure development (e.g., infrastructure development module 101A) and a second development module associated with application development (e.g., application development module 101B). The first development module may allow performance of one or more additional stages of the multi-stage computing framework that are not provided by the second development module, the one or more additional stages may comprise a linting stage and/or a validation stage.

The process of FIG. 5 is initiated at operation 510, at which one or more computing resources may be received in an unrestricted region. For example, as shown in FIG. 2, the infrastructure development module 101A may include a create stage 210, in which resources 120 may be created in, and received from, a preconfigured repository 211 of a managed source control service. The preconfigured repository 211 may be configured by a service that provides the computing framework 150. The preconfigured repository 211 may be designed to help developers continuously create code, templates, documentation, and deliverables with little friction. The preconfigured repository 211 may include easily removable examples and documentation, such as default code for executing in a customer environment and best practices associated with use of various services. In some examples, the infrastructure development module 101A may provide code review tool 212, which may be an automated (e.g., machine learning-based) tool for use in reviewing and debugging code that may be in the preconfigured repository 211.

At operation 512, the one or more computing resources may be linted in the unrestricted region. For example, as shown in FIG. 2, the infrastructure development module 101A may include a linting stage 220, in which resources 120 may be linted using linting tool 221, which may be an automated tool for resource linting. For example, the linting stage 220 may include reviewing templates and ensuring that security-related best practices are observed. At operation 514, the one or more computing resources may be scanned, in the unrestricted region, for computing viruses. For example, as shown in FIG. 2, the infrastructure development module 101A may include a scanning stage 230, in which resources 120 may be scanned for computing viruses using scanning tool 231, which may be an automated tool for resource scanning.

At operation 516, a test deployment of the one or more computing resources may be performed in the unrestricted region. For example, as shown in FIG. 2, the infrastructure development module 101A may include a validation stage 240, in which the computing framework 150 may determine, for example based on templates or other information from the preconfigured repository 211, a change set 241 (or other changes) associated with the infrastructure or other resources 120 being developed. The computing framework 150 may then attempt a test deployment 242 of the change set 241 (or other changes), for testing purposes, in the unrestricted region 110. If the changes are deployed successfully in the unrestricted region 110, then this may be an indication that the changes are likely to deploy successfully in the restricted region 111. By contrast, if the changes are not deployed successfully in the unrestricted region 110, then this may be an indication that the changes are unlikely to deploy successfully in the restricted region 111. In some examples, the test deployment 242 in the unrestricted region 110 may be subject to customer-specific constraints, such as identity management permissions associated with the customer.

At operation 518, the one or more computing resources may be packaged, in the unrestricted computing region, for transfer to the restricted computing region, wherein the packaging comprises at least one of generating a manifest file for the one or more computing resources or removing file types of the one or more computing resources that are unsupported by a region transfer tool. For example, as shown in FIG. 2, the infrastructure development module 101A may also include a packaging stage 250, in which resources 120 may be packaged for transfer to restricted region 111. In some examples, the packaging stage 250 may include unsupported file type removal 251. During unsupported file type removal 251, unsupported file types (i.e., file types that are not supported by the region transfer tool) may be identified and removed from the resources 120 that are being transferred to the restricted region 111. Furthermore, in some examples, for software artifact transfers, the region transfer tool may require a manifest file to be generated for the resources 120 that are being transferred to the restricted region 111. In some examples, the packaging stage 250 may additionally or alternatively include manifest generation 252, in which the manifest file may be generated. In some examples, a manifest file may sometimes be generated even if not explicitly required by a region transfer tool that is being used to perform the resource transfer to the restricted region 111.

At operation 520, a request for transfer of the one or more computing resources is provided to a transfer module. For example, as shown in FIG. 2, the infrastructure development module 101A may include a transfer requesting stage 260, in which a transfer request 261 may be sent to transfer module 102. In addition to, or as part of, the transfer request 261, the infrastructure development module 101A may provide related information to the transfer module 102, such as an indication of a storage location (e.g., bucket) at which the payload for transfer is stored, a payload key, a manifest key, and an indication of a notification recipient designated by the infrastructure development module.

FIG. 6 is a flowchart illustrating an example resource development process employed by an application development module that may be used in accordance with the present disclosure. As described above, the multi-stage computing framework may provide a plurality of development modules from which a selected development module may be selected. The plurality of development modules may comprise a first development module associated with computing infrastructure development (e.g., infrastructure development module 101A) and a second development module associated with application development (e.g., application development module 101B). FIG. 6 provides relates to an example in which the selected development module is application development module 101B.

The process of FIG. 6 is initiated at operation 610, at which one or more computing resources may be received in an unrestricted region. For example, as shown in FIG. 3, the application development module 101B may include a create stage 310. In some examples, the input sources for the create stage 310 may include a customer-provided repository 311 and a storage location 312. In some examples, the customer-provided repository 311 may be employed for scenarios in which developers are building from source code, while the storage location 312 may be used in scenarios in which an object is being transferred to restricted region 111. The customer-provided repository 311 may be a managed source control service repository that is provided and configured by a customer of the computing framework 150. By contrast, the storage location 312 may be a selected location in which objects or other resources 120 may be stored for transfer without the use of a managed source control service repository. For scenarios in which customer-provided repository 311 is used as an input source, the application development module 101B may include a build stage 320, in which a project of a managed build service may be triggered to produce a build artifact 321. Thus, in some examples (e.g., when building from source code), operation 610 may include receiving, by the computing framework 150, one or more computing resources from customer-provided repository 311 and from a build process. In some other examples (e.g., for transferring objects), operation 610 may include receiving, by the computing framework 150, one or more computing resources from storage location 312.

At operation 612, the one or more computing resources may be scanned, in the unrestricted region, for computing viruses. For example, as shown in FIG. 3, the application development module 101B may include a scanning stage 330. For scenarios in which customer-provided repository 311 is used as an input source, the code or other resources from the customer-provided repository 311 and/or the build artifact 321 may be virus scanned, during scanning stage 330, by a scanning tool 331. By contrast, when storage location 312 is used as an input source, a serverless computing function may be triggered to invoke the scanning tool 331 to virus scan the resources 120 from the storage location 312.

At operation 614, the one or more computing resources may be packaged, in the unrestricted computing region, for transfer to the restricted computing region, wherein the packaging comprises at least one of generating a manifest file for the one or more computing resources or removing file types of the one or more computing resources that are unsupported by a region transfer tool. For example, as shown in FIG. 3, the application development module 101B may include a packaging stage 340, in which resources 120 may be packaged for transfer to restricted region 111. In some examples, the packaging stage 340 may include unsupported file type removal 341. During unsupported file type removal 341, unsupported file types (i.e., file types that are not supported by the region transfer tool) may be identified and removed from the resources 120 that are being transferred to the restricted region 111. Furthermore, in some examples, for software artifact transfers, the region transfer tool may require a manifest file to be generated for the resources 120 that are being transferred to the restricted region 111. In some examples, the packaging stage 340 may additionally or alternatively include manifest generation 342, in which the manifest file may be generated. In some examples, a manifest file may sometimes be generated even if not explicitly required by a region transfer tool that is being used to perform the resource transfer to the restricted region 111.

At operation 616, a request for transfer of the one or more computing resources is provided to a transfer module. For example, as shown in FIG. 3, the application development module 101B may include a transfer requesting stage 350, in which a transfer request 261 may be sent to transfer module 102. In addition to, or as part of, the transfer request 261, the application development module 101B may provide related information to the transfer module 102, such as an indication of a storage location (e.g., bucket) at which the payload for transfer is stored, a payload key, a manifest key, and an indication of a notification recipient designated by the infrastructure development module.

Figure 7:
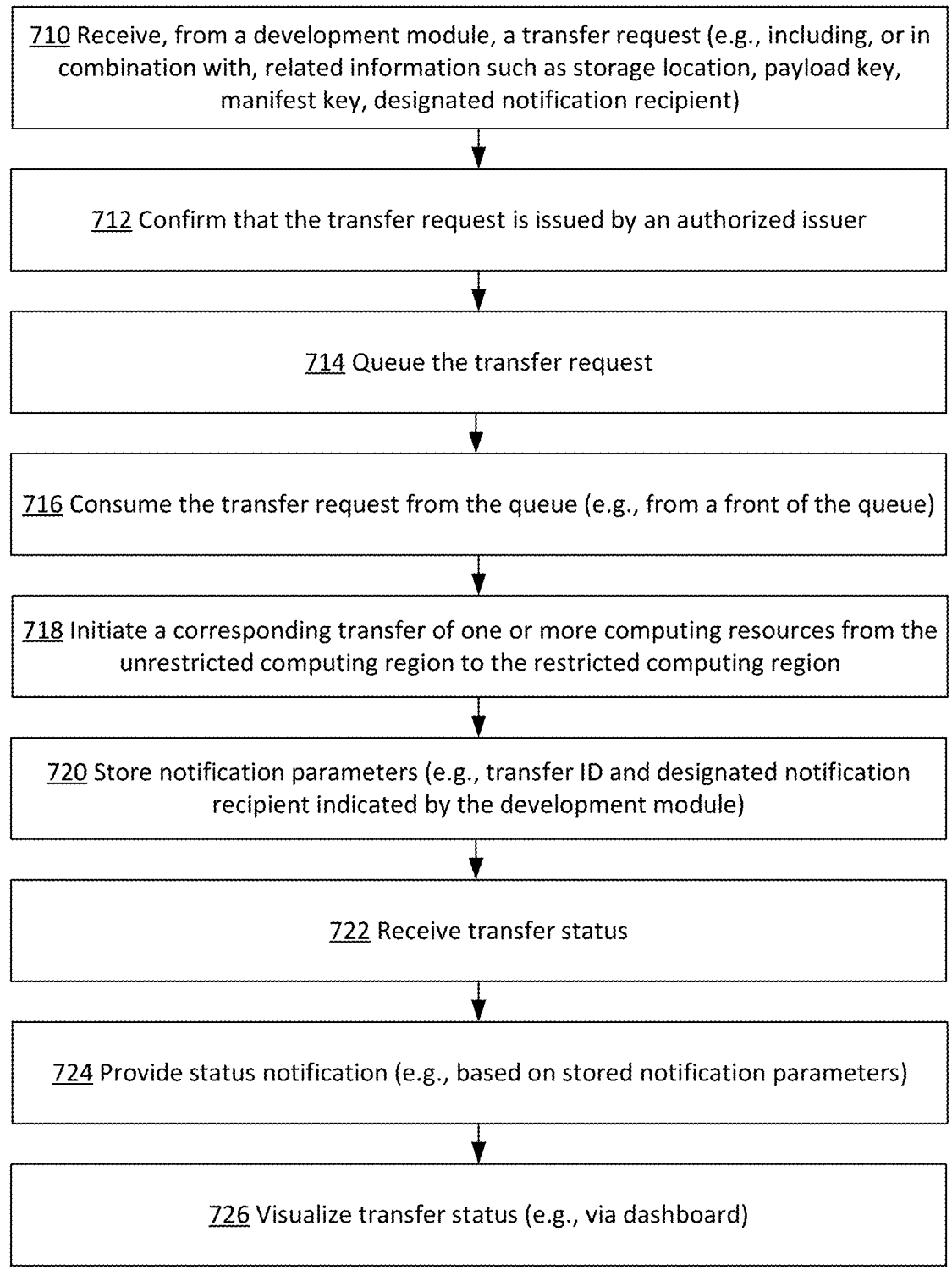
FIG. 7 is a flowchart illustrating an example resource transfer management process that may be used in accordance with the present disclosure.

FIG. 7 is a flowchart illustrating an example resource transfer management process that may be used in accordance with the present disclosure. The process of FIG. 7 may be performed by transfer module 102 of FIG. 2. The process of FIG. 7 is initiated at operation 710, at which a transfer request (e.g., including, or in combination with, related information such as storage location, payload key, manifest key, designated notification recipient) may be received from a development module (e.g., infrastructure development module 101A or application development module 101B). For example, as shown in FIG. 4, the transfer module may receive transfer requests 261A-N from infrastructure development module 101A and/or application development module 101B. As also described above, when issuing a transfer request 261, the infrastructure development module 101A or application development module 101B may provide related information to the transfer module 102, such as an indication of a storage location (e.g., bucket) at which the payload for transfer is stored, a payload key, a manifest key, and an indication of a notification recipient designated by the infrastructure development module.

At operation 712, it may be confirmed that the transfer request is issued by an authorized issuer. As described above, a transfer request queue 421 may be protected by a queue policy 411, which may allow only principals from certain designated accounts to write to the transfer request queue 421. For example, a customer may identify the accounts that the customer wishes to authorize to issue transfer requests 261A-N. These identified accounts may then be listed in queue policy 411. During control stage 410, the transfer module 102 may examine incoming transfer requests 261A-N to ensure that each of the transfer requests 261A-N is issued by one of the listed authorized accounts. If a given one of the transfer requests 261A-N is issued by one of the listed authorized accounts, then it may be added to the transfer request queue 421. By contrast, if another given one of the transfer requests 261A-N is not issued by one of the listed authorized accounts, then it may be excluded from the transfer request queue 421. In some examples, a hub and spoke model may be employed in which multiple development module accounts feed (i.e., provide transfer requests 261A-N to) a single transfer module 102 (executed in a single transfer module account).

At operation 714, the transfer request may be queued. For example, at queueing stage 420, the authorized ones of transfer requests 261A-N are written to the transfer request queue 421. As described above, each of transfer requests 261A-N may include (or may be associated with) related information, such as a payload key, a manifest key, and an indication of a designated recipient that is to receive notifications. This related information may also be stored in, or associated with, transfer request queue 421

At operation 716, the transfer request may be consumed from the queue (e.g. from a front of the queue). Additionally, at operation 718, a corresponding transfer (i.e., corresponding to the transfer request) of one or more computing resources from the unrestricted computing region to the restricted computing region is initiated. For example, the transfer module 102 also includes a transfer stage 430, at which resources 120 are transferred to the restricted region 111 via a region transfer tool 433. Specifically, during queue retrieval 432 of transfer stage 430, a series of serverless computing functions may read off the transfer request queue 421. In particular, when a next one of transfer requests 261A-N is ready to be processed (e.g., when it moves to the front of the transfer request queue 421), the corresponding queue entry will be read from transfer request queue 421. This may also include reading of related information included in, or associated with, the entry, such as a payload key, a manifest key, and an indication of a designated recipient that is to receive notifications. Based on this related information, the series of serverless computing functions may copy the payload for transfer to a designated storage service location. The series of serverless computing functions may also initiate transfer of the payload via region transfer tool 433. The transfer module 102 of the computing framework 150 may then transfer, via the region transfer tool, the one or more computing resources from the unrestricted computing region to the restricted computing region. A manifest for the transfer may also be obtained based on information provided in the transfer request 261 and provided to the region transfer tool 433.

At operation 720, notification parameters (e.g., transfer ID and designated notification recipient indicated by the development module) may be stored. For example, as described above, a transfer identifier (ID) for the transfer may be received from the region transfer tool 433. Furthermore, an identifier of a designated notification recipient (e.g., a resource name for a topic of the notification service) for the transfer may be determined based on information provided by the development module 101 in combination with the transfer request 261. The series of serverless computing functions may then store an association between the transfer ID and the designated notification recipient in a notification parameter store 431, such as may be provided by a database service.

At operation 722, a transfer status is received. For example, operation 722 may include receiving, from the region transfer tool, a status of the transfer of the one or more computing resources. As described above, the transfer module 102 may also include a notification stage 440. The notification stage 440 includes status monitoring 441, at which the region transfer tool 433 may be monitored to listen for a report of the status (e.g., success, failure or rejection) of the transfer operation. At operation 724, a notification status may be provided, for example based on the notification parameters stored at operation 720. Operation 724 may include providing a notification of the status to a recipient indicated by a development module of the multi-stage computing framework. In some examples, the status monitoring 441 may be performed via an event of a monitoring service. This event may then trigger a serverless computing function with the status of the transfer operation. The report of the status may include the transfer ID for the transfer. During notification parameter retrieval 442, the transfer ID received with the status may be used to look up, in the notification parameter store 431, the corresponding designated notification recipient (e.g., a resource name for a topic of the notification service) for the transfer. A notify function 443, such as a serverless computing function, may then send a notification 475 with the transfer ID and transfer status (e.g., success, failure or rejection) to the corresponding designated notification recipient. This may optionally cause the notification 475 to be received in a collaboration service 280, which, as described above, may be subscribed, such as via a webhook, to the designated notification recipient. This may allow developers that are working on the resources 120 to be notified of the statuses of transfer of the resources 120 even when the account that issues a transfer request 261 (e.g., the development module account) is different from the account that executes the transfer module 102 (e.g., the transfer module account). The corresponding record (i.e., the association between the transfer ID and the designated notification recipient) may then be deleted from the notification parameter store 431.

At operation 726, the transfer status may be visualized, for example via a dashboard. As described above, the transfer module 102 may include a visualization stage 450. As part of the visualization stage 450, statuses of transfer requests 261A-N may be displayed to users via a dashboard 451, such as may be provided by a monitoring service. In some examples, the dashboard 451 may display indications of transfers of transfer module 102 categorized into different status categories (e.g., success, failure or rejection), for example based on parameters such as count and size.

It is noted that contents, format and characteristics of the computing resources that may be developed and transferred by the computing framework may change during the development and transfer processes. For example, in some cases, the contents, format and/or characteristics of the computing resources may change via generation of build artifacts, generation of a change set, and the like. The term computing resources, as used herein, is intended to cover both resources that are initially received by the computing framework as well as additions, deletions, and modifications to those computing resources that occur during the development and transfer processes. Thus, one or more computing resources that are initially received by a computing framework, in the unrestricted region, may be considered to be the same computing resources (e.g., the payload) that are eventually transferred to, and deployed in, the restricted region even when a number of changes (e.g., additions, deletions, and modifications) are made to those computing resources during the development and transfer processes.

Figure 8:
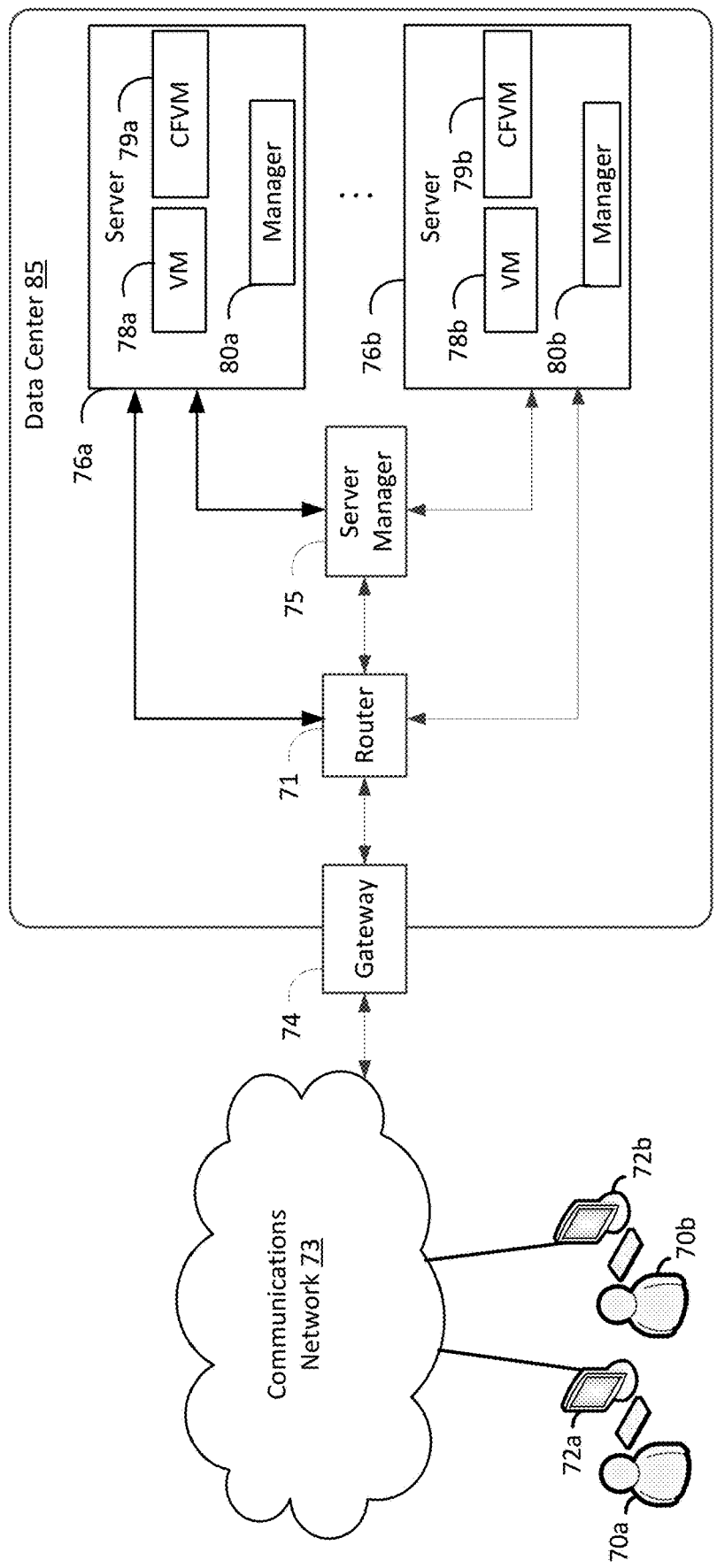
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include computing framework virtual machines (CFVM's) 79a-b, which are virtual machines that are configured to execute any, or all, of the operations of the computing framework described herein, such as to assist in development of computing resources in an unrestricted region and transfer of the computing resources to a restricted region.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
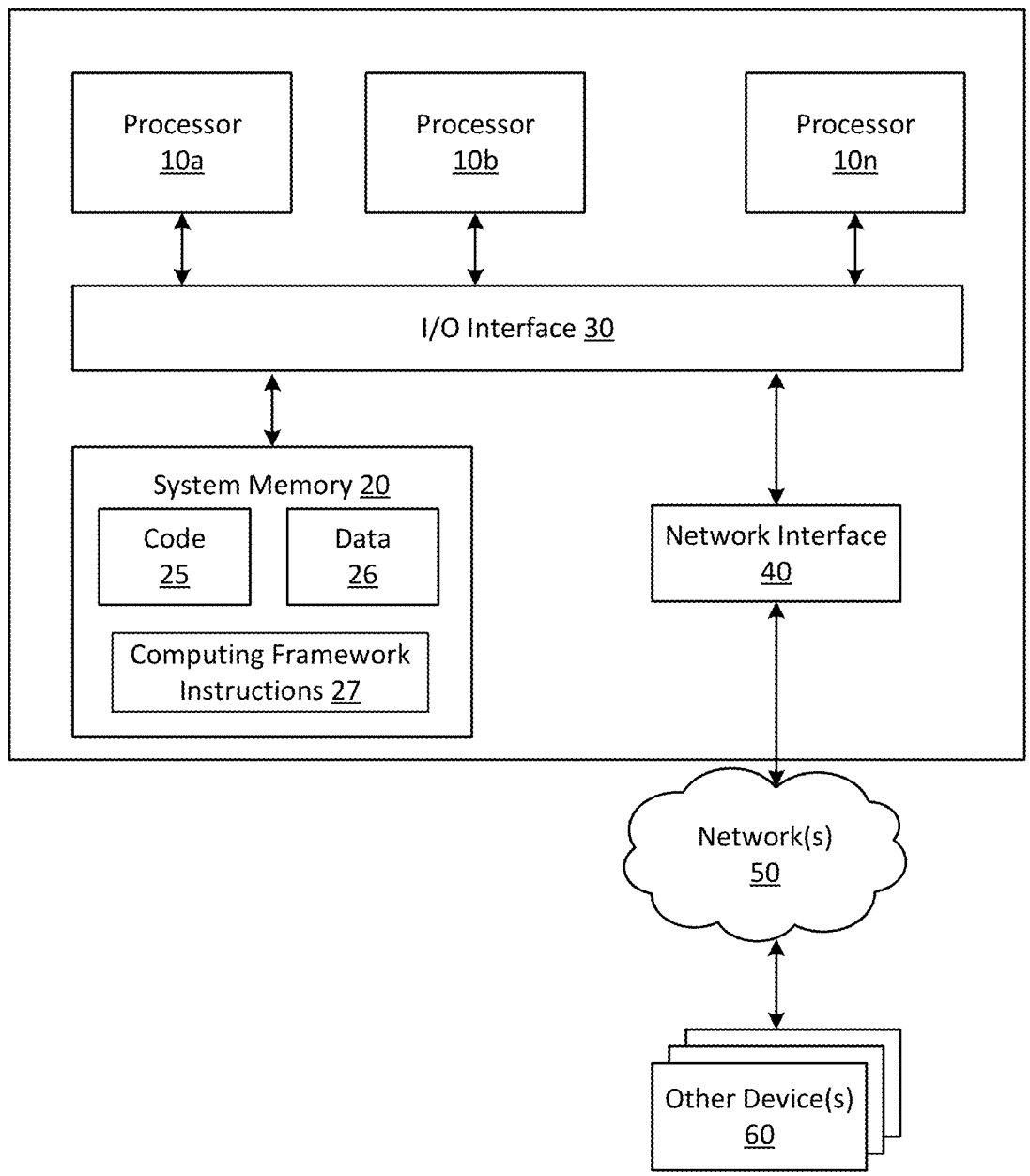
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes computing framework instructions 27, which are instructions for executing any, or all, of the operations of the computing framework described herein, such as to assist in development of computing resources in an unrestricted region and transfer of the computing resources to a restricted region.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform operations comprising:
receiving, in an unclassified computing region, by a selected development module of a multi-stage computing framework, one or more computing resources, wherein the multi-stage computing framework allows development, in the unclassified computing region, of the one or more computing resources that are transferred to, and deployed in, a classified computing region, wherein the selected development module is selected from a plurality of development modules provided by the multi-stage computing framework;
scanning, in the unclassified computing region, by the selected development module of the multi-stage computing framework, the one or more computing resources for computing viruses;
performing, in the unclassified computing region, by the selected development module of the multi-stage computing framework, a test deployment of the one or more computing resources
packaging, in the unclassified computing region, by the selected development module of the multi-stage computing framework, the one or more computing resources for transfer to the classified computing region, wherein the packaging comprises at least one of generating a manifest file for the one or more computing resources or removing file types of the one or more computing resources that are unsupported by a region transfer tool; and transferring, by a transfer module of the multi-stage computing framework, via the region transfer tool, the one or more computing resources from the unclassified computing region to the classified computing region.

2. The computing system of claim 1, wherein the multi-stage computing framework provides a plurality of development modules from which the selected development module is selected.

3. The computing system of claim 2, wherein the plurality of development modules comprise a first development module associated with computing infrastructure development and a second development module associated with application development.

4. The computing system of claim 3, wherein the first development module allows performance of one or more additional stages of the multi-stage computing framework that are not provided by the second development module, the one or more additional stages comprising at least one of a linting stage or a validation stage.

5. A computer-implemented method comprising:
receiving, in an unrestricted computing region, by a multi-stage computing framework, one or more computing resources, wherein the multi-stage computing framework allows development, in the unrestricted computing region, of the one or more computing resources that are transferred to, and deployed in, a restricted computing region;

scanning, in the unrestricted computing region, by the multi-stage computing framework, the one or more computing resources for computing viruses;

packaging, in the unrestricted computing region, by the multi-stage computing framework, the one or more computing resources for transfer to the restricted computing region, wherein the packaging comprises at least one of generating a manifest file for the one or more computing resources or removing file types of the one or more computing resources that are unsupported by a region transfer tool; and transferring, by the multi-stage computing framework, via the region transfer tool, the one or more computing resources from the unrestricted computing region to the restricted computing region.

6. The computer-implemented method of claim 5, wherein one or more stages of the multi-stage computing framework are selectable, by a user, to be included in, or excluded from, an invocation of the multi-stage computing framework.

7. The computer-implemented method of claim 5, wherein the restricted computing region is a classified region, and wherein the unrestricted computing region is an unclassified region.

8. The computer-implemented method of claim 5, further comprising linting, in the unrestricted computing region, by the multi-stage computing framework, the one or more computing resources.

9. The computer-implemented method of claim 5, further comprising performing, in the unrestricted computing region, by the multi-stage computing framework, a test deployment of the one or more computing resources.

10. The computer-implemented method of claim 5, further comprising:
receiving, by the multi-stage computing framework, from the region transfer tool, a status of a transfer of the one or more computing resources; and providing, by the multi-stage computing framework, a notification of the status to a recipient indicated by a development module of the multi-stage computing framework.

11. The computer-implemented method of claim 5, wherein the receiving, the scanning and the packaging are performed by a selected development module of the multi-stage computing framework, and wherein the transferring is performed by a transfer module of the multi-stage computing framework.

12. The computer-implemented method of claim 11, wherein the multi-stage computing framework provides a plurality of development modules from which the selected development module is selected.

13. The computer-implemented method of claim 12, wherein the plurality of development modules comprise a first development module associated with computing infrastructure development and a second development module associated with application development.

14. The computer-implemented method of claim 13, wherein the first development module allows performance of one or more additional stages of the multi-stage computing framework that are not provided by the second development module, the one or more additional stages comprising at least one of a linting stage or a validation stage.

15. One or more non-transitory computer-readable storage media having stored thereon computing instructions that, upon execution by one or more computing devices, cause the one or more computing devices to perform operations comprising:
receiving, in an unrestricted computing region, by a multi-stage computing framework, one or more computing resources, wherein the multi-stage computing framework allows development, in the unrestricted computing region, of the one or more computing resources that are transferred to, and deployed in, a restricted computing region;

scanning, in the unrestricted computing region, by the multi-stage computing framework, the one or more computing resources for computing viruses;

performing, in the unrestricted computing region, by the multi-stage computing framework, a test deployment of the one or more computing resources and packaging, in the unrestricted computing region, by the multi-stage computing framework, the one or more computing resources for transfer to the restricted computing region, wherein the packaging comprises at least one of generating a manifest file for the one or more computing resources or removing file types of the one or more computing resources that are unsupported by a region transfer tool, and wherein the region transfer tool transfers the one or more computing resources from the unrestricted computing region to the restricted computing region.

16. The one or more non-transitory computer-readable storage media of claim 15, wherein one or more stages of the multi-stage computing framework are selectable, by a user, to be included in, or excluded from, an invocation of the multi-stage computing framework.

17. The one or more non-transitory computer-readable storage media of claim 15, wherein the operations further comprise:

receiving, by the multi-stage computing framework, from the region transfer tool, a status of a transfer of the one or more computing resources; and providing, by the multi-stage computing framework, a notification of the status to a recipient indicated by a development module of the multi-stage computing framework.

18. The one or more non-transitory computer-readable storage media of claim 15, wherein the receiving, the scanning and the packaging are performed by a selected development module of the multi-stage computing framework.

19. The one or more non-transitory computer-readable storage media of claim 18, wherein the multi-stage computing framework provides a plurality of development modules from which the selected development module is selected.

20. The one or more non-transitory computer-readable storage media of claim 19, wherein the plurality of development modules comprise a first development module associated with computing infrastructure development and a second development module associated with application development.

* * * * *